United States Patent [19]

Haasen et al.

[11] 4,122,153

[45] Oct. 24, 1978

[54] RECYCLING METHOD FOR THE PREPARATION AND PROCESSING OF A HYDROXYL AMMONIUM SALT SOLUTION

[75] Inventors: Nicolaas F. Haasen, Heerlen; Cornelis G. M. Van de Moesdijk, Elsloo; Gerardus M. C. Wagemans, Neer, all of Netherlands

[73] Assignee: Stamicarbon, B.V., Geleen, Netherlands

[21] Appl. No.: 864,223

[22] Filed: Dec. 27, 1977

[30] Foreign Application Priority Data

Dec. 28, 1976 [NL] Netherlands ........................ 7614456

[51] Int. Cl.$^2$ ............................................. C07C 131/04
[52] U.S. Cl. ................................. 423/387; 260/566 A
[58] Field of Search .................... 260/566 A; 423/387

[56] References Cited

U.S. PATENT DOCUMENTS 3,641,150  2/1972  De Rooij ........................ 260/566 A

*Primary Examiner*—Gerald A. Schwartz
*Attorney, Agent, or Firm*—Cushman, Darby & Cushman

[57] ABSTRACT

An improved process is described for the reduction of ammonium ions, while avoiding any increase in nitrate ion concentration, in a liquid stream recycled between a zone of synthesis of hydroxyl ammonium salt and a zone for synthesis of oxime, wherein the liquid stream is contacted with a gas stream consisting essentially of nitrogen monoxide and containing nitrogen dioxide at a pressure above 1 atmosphere, at a temperature of at least 80° C., such that after the contact the molar $NO_2/NO$ ratio of the gas stream is within the range of between about $10^{-1}$ to $10^{-4}$:1.

2 Claims, No Drawings

RECYCLING METHOD FOR THE PREPARATION AND PROCESSING OF A HYDROXYL AMMONIUM SALT SOLUTION

The invention relates to a recyling method for the preparation and processing of a hydroxyl ammonium salt solution, in which an aqueous acid reaction medium is kept recycling between a zone for the synthesis of hydroxyl ammonium salt and a zone for the synthesis of oxime and in which nitrogen monoxide is added to the recycled liquid and catalytically reduced to hydroxyl amine by means of hydrogen, and the ammonium ions formed as a by-product in the reduction of the nitrogen monoxide are removed by putting the recycling liquid containing ammonium ions into contact with a gas flow substantially consisting of nitrogen monoxide and containing nitrogen dioxide at a temperature of at least 40° C., so that ammonium ions are decomposed to nitrogen.

A process of this type, which is known from U.S. Pat. No. 3,641,150, is important in the preparation of oximes from ketones of aldehydes, in particular, the preparation of cyclohexanone oxime from cyclohexanone. Cyclohexanone oxime is a well-known starting material for the preparation of the nylon-6 monomer.

According to the method described in said patent specification the recycled aqueous reaction medium or part of it is put into contact with nitrous gases under such conditions that the ammonium ions to be removed are decomposed to nitrogen. Here use can very well be made of nitrous gases from which the nitrogen dioxide has to be removed for the preparation of the nitrogen monoxide required for the reduction to hydroxyl amine.

This process is very satisfactory as regards the decomposition of the ammonium ions. It appeared, however, that in this process the nitrate concentration of the recycled liquid gradually increases, which has an adverse effect on the efficiency of the hydroxyl amine preparation, the required amount of hydrogen and the quality of the resulting oxime.

The invention provides a process in which the ammonium ions can be decomposed without an increase or even with a decrease of the nitrate concentration in the recyling liquid.

The recycling method according to the invention for the preparation and processing of a hydroxyl ammonium salt solution, in which an aqueous acid reaction medium is kept recycling between a zone for the synthesis of hydroxyl ammonium salt and a zone for the synthesis of oxime and in which nitrogen monoxide is added to the recycled liquid and catalytically reduced to hydroxyl amine by means of hydrogen, and the ammonium ions formed as a by-product in the reduction of the nitrogen monoxide are removed by putting the recycling liquid containing ammonium ions into contact with a gas flow substantially consisting of nitrogen monoxide and containing nitrogen dioxide at a temperature of at least 40° C., so that ammonium ions are decomposed to nitrogen, is characterized in that the recycling liquid is put in contact with the gas flow containing nitrogen dioxide at a pressure of over 1 atmosphere, a temperature of at least 80° C., and with the use of a gas flow with a molar $NO_2/NO$ ratio measured after said contact that ranges between $10^{-4}/1$ and $10^{-1}/1$.

The recycling liquid may be put in contact with the gas flow at various temperatures of over 80° C. As a higher temperature is chosen, a smaller reactor may be used under otherwise similar conditions, since the reaction rate will then be higher. Temperatures of over 180° C., however, are less suitable, as a practical embodiment will then require expensive equipment in connection with the suppression of corrosion and the high pressure needed to maintain the liquid state. In practice a temperature in the range of 85°–165° C. is found to give satisfactory results.

In the recyling process according to the invention the total amount or part of the recycling liquid may be put in contact with the nitrogen monoxide containing nitrogen dioxide.

If, in the oxime-synthesis zone, the oxime formation is completed, at a pH raised by the addition of ammonium ions (e.g. as ammonia water), with part of the recycling liquid discharged from the zone for the synthesis of hydroxyl ammonium salt, this part of the recycling liquid, after removal from the oxime-synthesis zone, has a high content of ammonium ions and is very suitable to effect the contact with the nitrogen monoxide containing nitrogen dioxide.

The molar $NO_2/NO$ ratio may be varied within said limits. As the temperature is higher, a higher molar $NO_2/NO$ ratio may be used to effect the desired decomposition of ammonium ions without the undesired formation of nitrate. If the gas flow contains not only nitrogen monoxide, but also oxygen, one mole of oxygen plus two moles of nitrogen monoxide are equated with two moles of nitrogen dioxide in the determination of said molar ratio.

The nitrogen dioxide in the gas flow to be used may be present as such, or it may be formed by reaction of nitrogen monoxide with oxygen or nitric acid in the recycling liquid during the contact of the gas flow with the recycling liquid.

The gas flow and the recycling liquid may be put in contact at various pressures over 1 atmosphere. A higher pressure involves a higher reaction rate under otherwise similar conditions. A pressure of over 50 atm. offers no advantage in practice, but may be used in principle.

The invention will be elucidated in the following examples.

EXAMPLE I

A gaseous mixture and a liquid discharged from a zone for the synthesis of oxime are continuously passed into a reactor (liquid capacity 1.5 m³) for 10 hours. The gaseous mixture to be fed in contains 0.14 mole of nitrogen dioxide, 0.25 mole of water and 0.05 mole of an inert substance (nitrogen or nitrous oxide) for every mole of nitrogen monoxide. The liquid to be fed in contains 1.45 moles of phosphoric acid, 0.64 mole of mono-ammonium phosphate, 0.11 mole of ammonium nitrate and 43 moles of water per kilogram. 22.4 kilomoles of nitrogen monoxide and 13400 kilograms of liquid are fed in per hour. The total absolute pressure in the reactor amounts to 10 atmospheres and the temperature to 118°–122° C.

The liquid discharged from the reactor contains 0.2 mole of monoammonium phosphate and 0.1 mole of ammonium nitrate, which shows that the nitrate concentration has not increased, while the concentration of ammonium ions has decreased by 60%. The gas discharged contains 0.005 mole of nitrogen dioxide, 0.33 mole of water and 0.37 mole of inert material per mole of nitrogen monoxide, and can be used as such for the reduction of nitrogen monoxide to hydroxyl amine.

When this experiment is repeated at 70° C. and 1 atmosphere, the nitrate concentration increases by 100%.

EXAMPLE II

In the same way as discribed in Example I, 21.2 kilomoles of nitrogen monoxide and 14500 kilograms of liquid are fed per hour to a similar reactor.

The gaseous mixture to be fed in contains 0.28 mole of nitrogen dioxide, 0.32 mole of water and 0.06 mole of inert material per mole of nitrogen monoxide. The liquid to be fed in contains 1.3 moles of phosphoric acid, 0.75 moles of mono-ammonium phosphate, 0.25 mole of ammonium nitrate and 42 moles of water per kilogram. The total absolute pressure in the reactor amounts to 6 atmospheres and the temperature to 118°–122° C.

The composition of the liquid discharged shows that the nitrate concentration has not increased, while the ammonium-ion concentration has decreased by 75%. The gaseous mixture discharged contained 0.015 mole of nitrogen dioxide per mole of nitrogen monoxide.

EXAMPLE III

In the way described in Example I, 6 kilomoles of nitrogen monoxide and 345 kilograms of liquid were fed per hour to a similar reactor.

The gaseous mixture to be fed in contains 0.01 mole of nitrogen dioxide and 0.04 mole of inert material per mole of nitrogen monoxide. The liquid to be fed in contains 1.7 moles of phosphoric acid, 0.4 mole of mono-ammonium phosphate, 0.2 mole of ammonium nitrate and 43 moles of water per kilogram. The total absolute pressure in the reactor amounts to 2.5 atmospheres and the temperature to 85° C.

The composition of the liquid discharged shows that the nitrate concentration has decreased by 15% and the ammonium-ion concentration by 50%.

The gaseous mixture discharged contained 0.0005 mole of nitrogen dioxide per mole of nitrogen monoxide.

When the experiment described is repeated at a temperature of 70° C. and an absolute pressure of 1 atmosphere, the concentration of ammonium ions decreases by 40%, but the nitrate-ion concentration increases by 25%. Continuation of this comparative experiment for 2 days results in an increase of the nitrate concentration to 1 mole per kilogram.

EXAMPLE IV 2.5 kilograms of aqueous liquid are put in a 10-liter autoclave provided with a gas inlet. This liquid contains 1.95 moles of phosphoric acid, 0.35 mole of monoammonium phosphate and 0.65 mole of ammonium nitrate per kilogram. The autoclave is closed and then nitrogen monoxide containing less than 0.001 mole of nitrogen dioxide per mole is pressed into the autoclave through the gas inlet until the pressure at room temperature is 10 atm. gauge. The temperature of the mixture in the autoclave is then raised to 160° C. and kept at this temperature for 10 hours. The pressure in autoclave then amounts to about 23 atm. gauge.

After cooling the gaseous phase and the liquid phase in the autoclave are analysed, and it appears that the nitrogen monoxide contains 0.0002 mole of nitrogen dioxide per mole, while the liquid phase contains hardly any ammonium ions and only 0.3 mole of nitrate ions per kilogram.

We claim:

1. In a recycling method for the preparation and processing of a hydroxyl ammonium salt solution, in which an aqueous acid reaction medium is continuously recycled between a zone for the synthesis of hydroxyl ammonium salt and a zone for the synthesis of cyclohexanone oxime and in which nitrogen monoxide is added to the recycled liquid and catalytically reduced to hydroxyl amine by means of hydrogen, and the ammonium ions formed as a by-product in the reduction of the nitrogen monoxide are removed by contacting the recycling liquid containing ammonium ions with a gas flow substantially consisting of nitrogen monoxide and containing nitrogen dioxide to nitrogen, the improvement consisting essentially in that the recycling liquid is contacted with said gas flow containing nitrogen dioxide at a pressure of over 1 atmosphere, a temperature of from 85° to 165° C., and with the use of a gas flow which has a molar $NO_2/NO$ ratio measured after said contact that ranges between $10^{-4}/1$ and $10^{-1}/1$.

2. The recycling method according to claim 1 wherein said contact is effected with part of the recycling liquid in which the ammonium-ion concentration has been raised.

* * * * *